United States Patent
Gowda et al.

(10) Patent No.: US 12,271,473 B2
(45) Date of Patent: Apr. 8, 2025

(54) LEASED INFRASTRUCTURE TRUST DOMAIN AUDITS

(71) Applicant: EMC IP Holding Company LLC, Hopkinton, MA (US)

(72) Inventors: Srinivas Gowda, Santa Clara, CA (US); Shyam Iyer, Cedar Park, TX (US); Syama Poluri, Round Rock, TX (US)

(73) Assignee: EMC IP HOLDING COMPANY LLC, Hopkinton, TX (US)

( * ) Notice: Subject to any disclaimer, the term of this patent is extended or adjusted under 35 U.S.C. 154(b) by 478 days.

(21) Appl. No.: 17/475,750

(22) Filed: Sep. 15, 2021

(65) Prior Publication Data

US 2023/0077525 A1  Mar. 16, 2023

(51) Int. Cl.
*G06F 21/55* (2013.01)
*G06F 21/10* (2013.01)
*G06F 21/57* (2013.01)

(52) U.S. Cl.
CPC .......... *G06F 21/554* (2013.01); *G06F 21/105* (2013.01); *G06F 21/57* (2013.01)

(58) Field of Classification Search
CPC .. G06F 21/554; G06F 21/57; G06F 2221/033; G06F 2221/034; G06F 21/105; G06F 2221/2101
See application file for complete search history.

(56) References Cited

U.S. PATENT DOCUMENTS

| | | | |
|---|---|---|---|
| 10,412,191 B1* | 9/2019 | Brandwine | G06F 9/5077 |
| 2003/0177388 A1* | 9/2003 | Botz | H04L 63/0807 |
| | | | 726/10 |
| 2005/0117587 A1* | 6/2005 | Kawato | H04L 47/724 |
| | | | 370/395.21 |
| 2005/0132229 A1* | 6/2005 | Zhang | H04L 63/20 |
| | | | 726/4 |
| 2009/0100261 A1* | 4/2009 | Aoshima | H04L 63/20 |
| | | | 709/229 |
| 2013/0318343 A1* | 11/2013 | Bjarnason | H04L 41/0809 |
| | | | 713/157 |
| 2015/0371034 A1* | 12/2015 | Miller | G06F 21/577 |
| | | | 726/17 |
| 2016/0261593 A1* | 9/2016 | Bradley | H04L 63/0853 |
| 2018/0212970 A1* | 7/2018 | Chen | H04L 9/3236 |
| 2019/0087575 A1* | 3/2019 | Sahita | G06F 21/71 |
| 2020/0119981 A1* | 4/2020 | Guthrie | H04L 63/0272 |
| 2021/0110070 A1* | 4/2021 | Vahldiek-Oberwagner | |
| | | | H04L 9/14 |
| 2021/0111892 A1* | 4/2021 | Vahldiek-Oberwagner | |
| | | | G06F 21/57 |
| 2022/0012088 A1* | 1/2022 | Guim Bernat | G06F 9/5077 |

(Continued)

*Primary Examiner* — Benjamin C Wu
(74) *Attorney, Agent, or Firm* — Chamberlain, Hrdlicka, White, Williams & Aughtry; Aly Z. Dossa (57) ABSTRACT

A method for processing trust and security for leased infrastructure includes: detecting a first audit event directed to the leased infrastructure; initiating, in response to detecting the first audit event, an execution of a first trust audit; making a first determination, based on a result of the first trust audit, that the first audit event is a verified event; and transmitting, in response to the first determination and to a computing device of a user leasing the leased infrastructure, first instructions for the computing device to display a first output notifying the user that the leased infrastructure is in a trusted domain.

7 Claims, 5 Drawing Sheets

(56) References Cited

U.S. PATENT DOCUMENTS

2022/0086148 A1* 3/2022 Chaganti ............. H04L 63/0876
2022/0094690 A1* 3/2022 Tarkhanyan ............ G06F 9/505
2024/0388589 A1* 11/2024 Venkatesan ........... H04L 63/102

* cited by examiner

LEASED INFRASTRUCTURE TRUST DOMAIN AUDITS

BACKGROUND

Infrastructures (e.g., software, hardware, or a combination of both) may be leased to customers requiring these resources. Various events (e.g., customer-related actions and non-customer-related actions) may result in a violation of a lease agreement of these leased infrastructure. Thus, providers of these leased infrastructures wish to be able to identify when these violations occur.

SUMMARY

In general, certain embodiments described herein relate to a method for processing trust and security for leased infrastructure. The method comprises: detecting a first audit event directed to the leased infrastructure; initiating, in response to detecting the first audit event, an execution of a first trust audit; making a first determination, based on a result of the first trust audit, that the first audit event is a verified event; and transmitting, in response to the first determination and to a computing device of a user leasing the leased infrastructure, first instructions for the computing device to display a first output notifying the user that the leased infrastructure is in a trusted domain.

In general, certain embodiments described herein relate to a non-transitory computer readable medium (CRM) comprising computer readable program code, which when executed by a computer processor enables the computer processor to perform a method for processing trust and security for leased infrastructure. The method comprises: detecting a first audit event directed to the leased infrastructure; initiating, in response to detecting the first audit event, an execution of a first trust audit; making a first determination, based on a result of the first trust audit, that the first audit event is a verified event; and transmitting, in response to the first determination and to a computing device of a user leasing the leased infrastructure, first instructions for the computing device to display a first output notifying the user that the leased infrastructure is in a trusted domain.

In general, certain embodiments described herein relate to a system including: a storage; and a processor coupled to the storage. The processor is configured to: detect a first audit event directed to the leased infrastructure; initiate, in response to detecting the first audit event, an execution of a first trust audit; make a first determination, based on a result of the first trust audit, that the first audit event is a verified event; and transmit, in response to the first determination and to a computing device of a user leasing the leased infrastructure, first instructions for the computing device to display a first output notifying the user that the leased infrastructure is in a trusted domain.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a system in accordance with one or more embodiments.

FIG. 1.2 shows a diagram of an example service and trust validation device in accordance with one or more embodiments.

DETAILED DESCRIPTION

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

One or more embodiments disclosed is directed to a system and method for processing trust and security for leased infrastructure. In particular, in one or more embodiments, a trusted domain and an untrusted domain may be initialized. All components (e.g., hardware, software, or a combination of both) and/or actions (e.g., configuration changes, component additions, component removals, etc.) approved by a provider of a leased infrastructure (herein also referred to simply as "a lease") may fall within the trusted domain. Everything else may fall within the untrusted domain. The scope of what may fall into the trusted and/or untrusted domain may be defined in one or more clauses included in a lease agreement for the leased infrastructure. This scope may also be defined as a set of rules (e.g., a list of approved and/or disapproved resources (hardware, software, or any combination thereof) and/or user actions, etc.) included in a trust domain configuration file, which is discussed in more detail below.

Furthermore, in one or more embodiments, as part of a billing and/or lease validation, the leased infrastructure may be continuously monitored by the provider to determine whether all of the components making up the leased infrastructure fall within the trusted domain. This enables the provider to determine whether any violations of the lease agreement have occurred. For example, a violation of the lease agreement may occur if any part of the leased infrastructure falls within the untrusted domain (i.e., outside the trusted domain). Various events (e.g., customer-related actions and non-customer-related actions) may result in the violation of the lease agreement. Examples of these events are described in more detail below. The above determination may also enable providers to determine billing amounts for costs associated with leasing the leased infrastructure. For example, customers may only wish to pay for use of the leased infrastructure if the leased infrastructure is in the trusted domain. Therefore, it is important to determine whether the leased infrastructure still falls within the trusted domain on an on-going basis.

The various embodiments discussed above are now described in more detail below.

Figure 11:
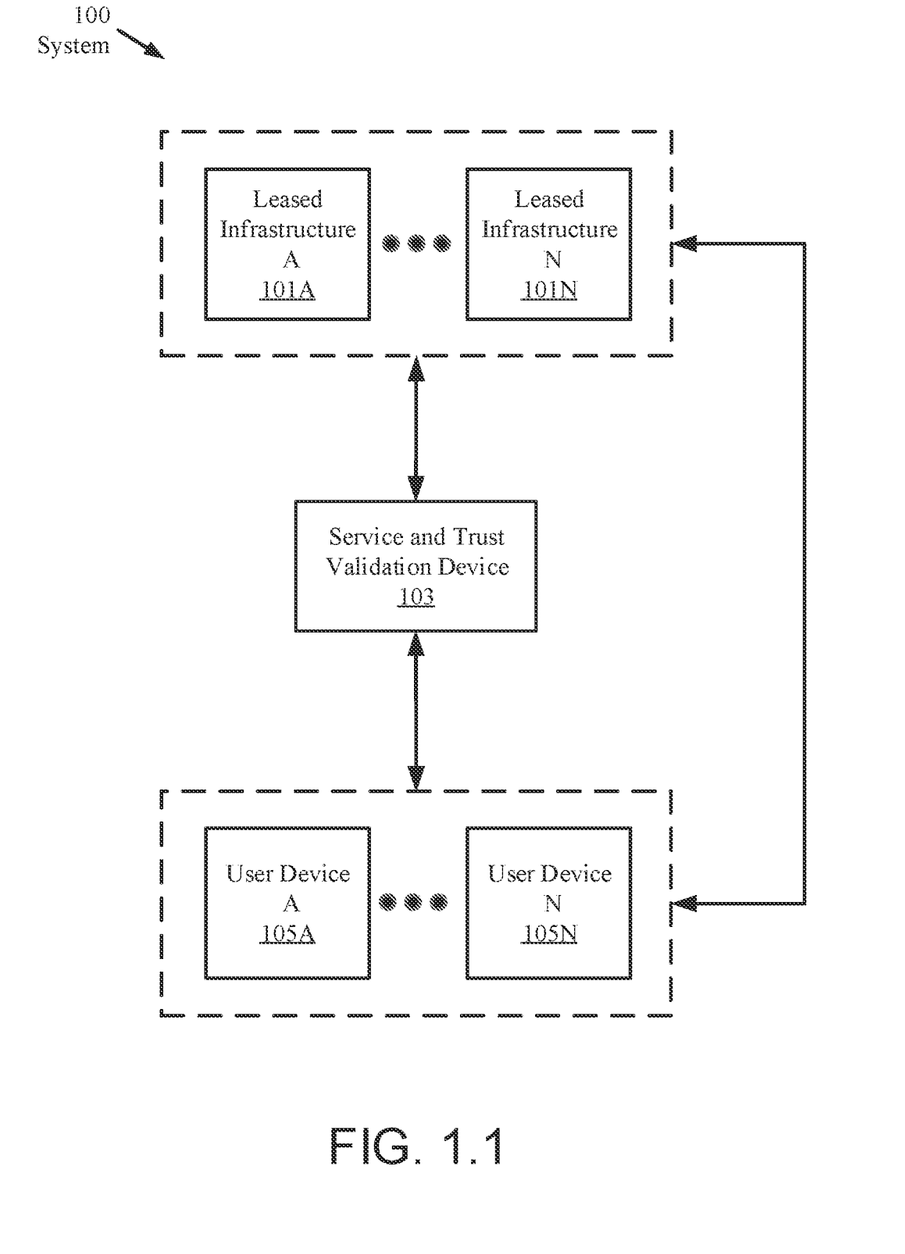

FIG. 1.1 shows a system (100) in accordance with one or more embodiments. The system (100) includes one or more leased infrastructures (101A, 101N), a service and trust validation device (103), and one or more user devices (105A, 105N). Each of these components of the system (100) will be described in more detail below.

In one or more embodiments disclosed herein, each of the leased infrastructures (101A, 101N) may be software, hardware, or a combination thereof. More specifically, each leased infrastructure (101A, 101N) may include one or more hardware components (e.g., storage devices, servers, modems, etc.), services (e.g., firewall services, anti-virus services, data monitoring services, etc.), and/or resources (e.g., digital storage space, computing resources, etc.).

Said another way, a leased infrastructure (101A, 101N) may include any form of computing resources (hardware, software, or a combination thereof) provided by a provider of the leased infrastructure (101A, 101N) to a customer that wishes to lease rather than purchase these computing resources. For example, assume that the provider is a telecommunications company offering internet services. In this example, the leased infrastructure (101A, 101N) may include a network device (e.g., a modem) configured with the provider's software configuration and resources that allows a customer to access internet services offered by the provider. As another example, the leased infrastructure (101A, 101N) may be a computing system (e.g., 400, FIG. 4) or an entire datacenter comprising multiple computing systems offering various services. As yet another example, the leased infrastructure (101A, 101N) may be a server hosting one or more virtual machines that a customer may access and use as part of a pay-per-use service provided by the provider.

In one or more embodiments, each of the leased infrastructures may be directly (or operatively, e.g., via a network (not shown)) connected to at least one service and trust validation device (103), and to one or more of the user devices (105A, 105N).

In one or more embodiments disclosed herein, the service and trust validation device (105) is a physical device or a virtual device (i.e., a virtual machine executing on one or more physical devices) that may be used for performing various embodiments of the disclosure (e.g., the process discussed below in FIG. 2). The physical device may correspond to any physical system with functionality to implement one or more embodiments of the disclosure. For example, the physical device may be a server (i.e., a device with at least one or more processor(s), memory, and an operating system such as the computing system 400 of FIG. 4) that is that is directly (or operatively, e.g., via a network) connected to one or more of the leased infrastructures (101A, 101N) and one or more of the user devices (105A, 105N).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment of the disclosure, the physical device may correspond to a computing system that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

Figure 12:
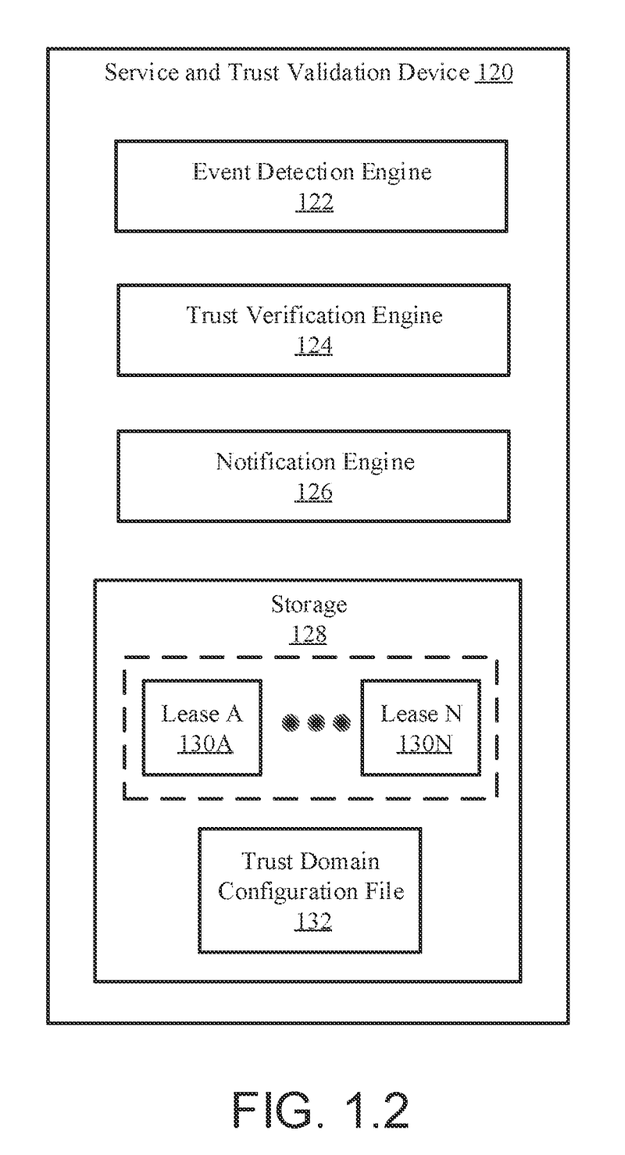

Additional details of the service and trust validation device (105) are discussed below in FIG. 1.2.

In one or more embodiments disclosed herein, each of the user devices (105A, 105N) is a physical device or a virtual device (discussed above) such as a personal computing system (e.g., a laptop, a cell phone, a tablet computer, a virtual machine executing on a server, etc.) of a user (i.e., a customer of the provider of the leased infrastructure). Each of the user devices (105A, 105N) may be directly (or operatively, e.g., via the network) connected to at least one of the service and trust validation device (103) and one or more of the leased infrastructures (101A, 101N).

Turning now to FIG. 1.2, FIG. 1.2 shows an example service and trust validation device (120) in accordance with one or more embodiments of this disclosure. The service and trust validation device (120) may be the same as the service and trust validation device (105) described above in FIG. 1.1. In addition to the components discussed above in reference to FIG. 1.1, the service and trust validation device (120) further includes: an event detection engine (122); a trust verification engine (124); a notification engine (126); and a storage (128). In one or more embodiments, the event detection engine (122), the trust verification engine (124), the notification engine (126), and the storage (128) may be operatively connected to one another to have access to information used and/or stored by each of these components. Each of the components illustrated in FIG. 1.2 is described below.

In one or more embodiments disclosed herein, the event detection engine (122) may be implemented in hardware (e.g., circuitry), software, or any combination thereof. The event detection engine (122) is configured to detect an audit triggering event (herein referred to as an "audit event") that has occurred with respect to any leased infrastructure (e.g., 101A-101N, FIG. 1.1) connected to the service and trust validation device (105). Additional details of audit events and the detection of audit events are discussed below in Steps 200 and 202 of FIG. 2.

In one or more embodiments disclosed herein, the trust verification engine (124) may be implemented in hardware (e.g., circuitry), software, or any combination thereof. The trust verification engine (124) is configured to initiate a trust audit in order to determine (i.e., verify) whether an audit event is: (i) a verified event that is trusted and keeps the leased infrastructure within a trust domain; or (ii) a non-verified event that is not trusted and takes the leased infrastructure out of the trust domain into the untrusted domain. Additional details with regard to the trust audits executed by the trust verification engine are discussed below in Steps 204 and 206 of FIG. 2.

In one or more embodiments disclosed herein, the notification engine (126) may be implemented in hardware (i.e., circuitry), software, or any combination thereof. The notification engine (122) is configured to transmit one or more notifications (e.g., in the form of messages, instructions to display a message, etc.) to a user device associated with the leased infrastructure associated with the audit event (i.e., a user device of a customer leasing the leased infrastructure with the audit event). The notification engine (126) may also transmit general messages to any of the user devices. Additional details of the notifications transmitted by the notification engine (126) is discussed below in Step 208 of FIG. 2.

In one or more embodiments disclosed herein, the storage (128) is implemented using devices that provide data storage services (e.g., storing data and providing copies of previously stored data). For example, storage (128) may include any quantity and/or combination of memory devices (i.e., volatile storage), longer term storage devices (i.e., persistent storage), other types of hardware devices that may provide short term and/or long term data storage services, and/or logical storage devices (e.g., virtual persistent storage/virtual volatile storage).

In one or more embodiments disclosed herein, storage (128) stores one or more leases (130A, 130N) and at least one trust domain configuration file (132). Each of these components stored in the storage (128) will be discussed in more detail below.

In one or more embodiments, each of the leases (130A, 130N) may be a legal contractual agreement (i.e., contract) specifying the metes and bounds of a customer's use of one or more leased infrastructure. Said another way, each lease (130A, 130N) may be a contract by which the provider of the leased infrastructure conveys use of the leased infrastructure to a customer (or a group of customers) for a specified time in return for compensation of any type (e.g., periodic payments). In one or more embodiments, each lease (130A, 130N) may include information defining the metes and bounds of a trust domain associated with the leased infrastructure associated with the lease (130A, 130N). Anything that falls outside of these metes and bounds would be determined as being part of an untrusted domain. These metes and bounds may include for example, and is not limited to, a lease start date, a lease expiration date, a lease renewal agreement, a lease renewal date, a list of authorized actions to be performed on the leased infrastructure by the customer, a list of authorized components (hardware, software, or any combinations thereof) to be added and/or removed from the leased infrastructure, etc.

In one or more embodiments disclosed herein, the above-discussed information included in the leases (130A, 130N) that define the metes and bounds of a trust domain may be aggregated and stored in the trust domain configuration file (132). The trust domain configuration file (132) may be accessed and used (e.g., parsed) by the trust verification engine (124) to determine whether an audit event occurring at a specific leased infrastructure is a verified event that falls within the metes and bounds of a lease associated with that specific leased infrastructure.

In one or more embodiments, the trust domain configuration file (132) may be saved in any format (e.g., a database, a data structure, etc.), and may store the information associated with each of the leases (130A, 130N) in any format (e.g., a list of approved actions, a list of approved and disapproved actions, a list of actions and other event related information, etc.). For example, the trust domain configuration file (132) may specify predetermined trusted measurement values associated with resources (hardware, software, or any combination thereof) that may be added and/or removed from one or more leased infrastructures). In one or more embodiments, a trust domain configuration file (132) may include information from all leases (130A, 130N) stored in a storage (128) of the service and trust validation device (120). Alternatively, a separate and distinct trust domain configuration file (132) may be created for and associated with each lease (130A, 130N) stored in the storage (128).

In one or more embodiments disclosed herein, prior to the start of a new lease (i.e., before a new lease begins), the service and trust validation device (120), using any combination of the event detection engine (122), the trust and verification engine (124), and other components (e.g., a processor) not shown in FIG. 1.2, may execute an initialization process to ensure that one or more leased infrastructures are in condition for being leased. The initialization process may include, but is not limited to: tamper verification and proofing of all resources of the one or more leased infrastructures; data sanitation of all data stored in storages of the one or more leased infrastructures; and configuration (e.g., basic input/output system (BIOS), firmware, operating system (OS), etc.) integrity verification. One of ordinary skill in the art would appreciate that suitable process for executing any of the above initialization processes may be applied without departing from the scope of this disclosure One skilled in the art will recognize that the architecture of the system (100) and of the service and trust validation device (120) is not limited to the components shown in FIGS. 1.1 to 1.2. For example, the system (100) may include any number of service and trust validation devices (105). Further, the service and trust validation device (120) may include components (e.g., a processor) not shown in FIG. 1.2.

Figure 2:
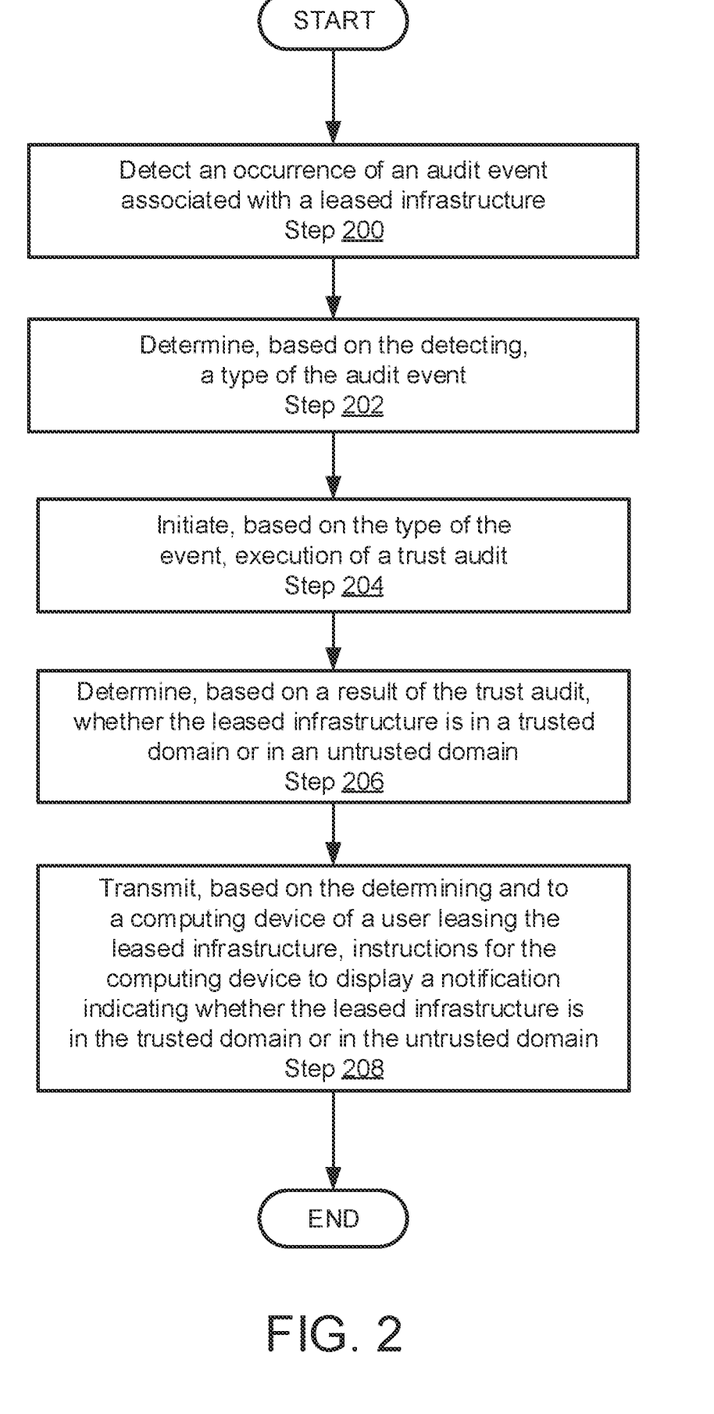
FIG. 2 shows a flowchart in accordance with one or more embodiments.

FIG. 2 shows a flowchart of a method in accordance with one or more embodiments of the invention. The method depicted in FIG. 2 may be performed to process trust and security for leased infrastructure in accordance with one or more embodiments of the invention. The method shown in FIG. 2 may be performed by, for example, the service and trust validation device (e.g., 103, FIG. 1.1; 120, FIG. 1.2).

Other components of the systems in FIG. 1.1 (e.g., a computing device that is part of a leased infrastructure (101A, 101N)) may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In Step 200, an occurrence of an audit event associated with a leased infrastructure is detected. In one or more embodiments, the audit event may be detected by the event detection engine (e.g., 122, FIG. 1.2) of the service and trust validation device. Based on a type of the audit event, different detections may be employed. The types of audit events and their respective detection methods is discussed below in more detail.

In Step 202, the type of the detected audit event is determined. In one or more embodiments, the type of the detected audit event may be determined by how the audit event was detected by the service and trust validation device. Types of audit events and how each type of audit event is detected will now described in more detail.

In one or more embodiments, a first type of audit event may be a time and lease based event that triggers a planned audit. A planned audit may occur based on information included in one or more leases associated with a specific leased infrastructure. For example, a planned audit event may occur at a lease start date, a lease expiration data, a lease renewal date, and/or any date associated with milestones or special date set by one or more users of a provider providing the leased infrastructure. As another example, the planned audit may occur periodically (e.g., every month, every few days, every few weeks, etc.) at a predetermined rate (e.g., set by one or more users, the provider, etc.). As an example, this predetermined rate may correspond to a billing cycle associated with costs of leasing the leased infrastructure.

These planned audits may be preconfigured (i.e., pre-programmed) into the service and trust validation device (e.g., into the storage, into a separate configuration file stored in the storage, etc.). If a leased infrastructure includes a computing system, these planned audits may also be preconfigured into the leased infrastructure. When a date and time matching a date and time set for each planned audit occur, the event detection engine is notified of the planned audit and detects the occurrence of the planned audit.

In one or more embodiments, a second type of audit event may be the addition and/or removal of resources (hardware, software, or any combination thereof) from the leased infrastructure. Such an audit event may trigger an event driven audit to determine whether the addition and/or removal of the resources is authorized by the provider of the leased infrastructure. In one or more embodiments, resources that may be added and/or removed my include, but are not limited to: any type of hardware components (e.g., graphical processing units (GPUs), hard drive devices, portable storage devices such as a universal serial bus (USB) device, a mouse, a keyboard, a web camera, etc.); software components (e.g., an application, a program, etc.); and resources that offer services that include a combination of hardware and software components (e.g., key management service resources, networking service resources, storage service resources, etc.).

The events triggering the event type audits may be detected by the event detection engine through a monitoring of one or more event logs associated with one or more computing systems that are operatively connected to and/or execute one or more components making up a leased infrastructure. In one or more embodiments, the event detection engine may be configured to continuously (or at a predetermined interval set by a user) monitor activities recorded in the event logs. In one or more embodiments, when activities indicating that the leased infrastructure has been changed in any way (i.e., when resources are added and/or removed from the leased infrastructure) are detected, the event detection engine will know that detected event is associated with the second type of audit event that triggers an event driven audit. Additionally, in one or more embodiments, the computing systems associated with each leased infrastructure may be configured to transmits a notification to the event detection engine whenever a component addition and/or removal has been detected.

In one or more embodiments, a third type of audit event may be a change in a configuration (e.g., firmware, basis input/output system (BIOS), operating system (OS), etc.) of one or more computing systems associated with a leased infrastructure. Such an audit event may trigger a configuration audit to determine whether the change to the configuration of the one or more computing systems is authorized by the provider of the leased infrastructure (i.e., that the change is an authorized configuration change). The events triggering the event type audits may also be detected by the event detection engine through the monitoring of the event logs.

These events may also be detected by the event detection engine through a continuous (or periodical at a predetermined rate) monitoring of the configurations of each of the one or more computing systems. Even further, the computing systems of the leased infrastructures may be configured to transmit a notification to the event detection engine whenever a configuration type change has been detected and/or implemented.

In one or more embodiments, a fourth type of audit event may be a time based event that triggers an asynchronous audit. Timing for the asynchronous audit may be preconfigured (i.e., pre-programmed) into the service and trust validation device by a user associated with the provider of the leased infrastructure. The asynchronous audit may be triggered to perform any one (or all) of the above-discussed audits (i.e., the planned audit, the event driven audit, and the configuration audit) to determine whether a leased infrastructure is still operating within the trusted domain defined by the provider within the lease associated with the leased infrastructure.

Although only four types of audit events have been described above, one of ordinary skill in the art would appreciate that possible occurring audit events are not limited the four types discussed above. Additionally, other types of audit events may be identified and/or relied upon by different providers of leased infrastructures based on each provider's preferences without departing from the scope of one or more embodiments disclosed herein.

In Step 204, execution of a trust audit is initiated based on the determination of the type of event. The trust audit may be executed by the trust verification engine (e.g., 124, FIG. 1.2) of the service and trust validation device to generate a trust audit result. In Step 206, the trust audit result will be used to determine whether the leased infrastructure falls within the trusted domain or the untrusted domain. More specifically, the trust audit result may be used to determine whether the audit event triggering an audit is a verified event that falls within the metes and bounds defined by a lease or a non-verified event that falls outside of the metes and bounds defined by the lease. Details about how a trust audit is executed for each of the above-discussed audit types will now be described in more detail below.

In one or more embodiments, the trust audit of a planned audit is executed to determine whether the leased associated with the leased infrastructure is still valid (i.e., is still in effect). As an example, the trust audit may be executed to determine whether a customer is using one or more resources of a leased infrastructure after one or more leases associated with that leased infrastructure has expired (i.e., verifying a lease state of the lease). The result of the trust audit for a planned audit will specify this information (e.g., whether the customer is using leased infrastructure on an expired lease) to the trust verification engine. In response, the trust verification engine will determine that: (i) the leased infrastructure being used by the customer is in the trusted domain if the lease has not expired; and (ii) the leased infrastructure being used by the customer is in the untrusted domain if the lease has expired.

In one or more embodiments, with respect to the event driven audit, the trust audit is executed to determine whether any additions and/or removal of (i.e., changes to) resources made by a customer fall outside the metes and bounds of a lease associated with the leased infrastructure being leased by the customer. In one or more embodiments, this determination may be made by the trust verification engine by comparing a change made to the resources with the set of rules defined in the trust domain configuration file. More specifically, when a resource is added to a leased infrastructure, the service and trust validation device (or any computing system associated with the leased infrastructure) may take measurements of the added resource to determine one or more information items associated with the added resource (e.g., manufacturer of the added resource, type of added resource, etc.). When a resource is removed, the service and trust validation device may take measurements of the leased infrastructure to determine the specific resource that was removed. In the context of one or more embodiments disclosed, taking measurements of a resource (hardware, software, or any combination thereof) and/or the leased infrastructure means to retrieve information associated with one or more components making up the resource and/or the leased infrastructure. For example, assume that a customer installs an extra hard drive to a computer (i.e., the leased infrastructure) that the customer is leasing. Further assume that the leased computer is able to obtain information items (e.g., manufacturer name, a serial number, a manufacturing number, specifications of the hard drive, etc.) associated with the added hard drive. In this example, taking measurements of the added hard drive involves the service and trust validation device retrieving these information items from the leased computer.

The result of these measurements are then compared to the contents of the trust domain configuration file (e.g., predetermined trusted measurement values stored in the trust domain configuration) to determine whether the change to the resource is an authorized change or an unauthorized change. In response, the trust verification engine will determine that: (i) the audit event is a verified event and that the leased infrastructure is in the trusted domain if the resource change is an authorized change; and (ii) the audit event is a non-verified event and that the leased infrastructure is in the untrusted domain if the resource change is an unauthorized change. For example, assume that a customer added a resource associated with company A to a leased infrastructure provided by company B. Further assume that company A is a direct competitor of company B and that all resources offered by company A are not listed as unauthorized (or not included within) the trust domain configuration file. In this example, the resource addition is an unauthorized change and, based on the unauthorized change, the leased infrastructure falls within the untrusted domain.

In one or more embodiments, with respect to the configuration audit, the trust audit is executed to determine whether one or more configuration changes (e.g. a firmware update, modifications to one or more parts of the BIOS, adding and/or removing an OS, etc.) made by a customer fall outside the metes and bounds of a lease associated with the leased infrastructure being leased by the customer. In one or more embodiments, this determination may be made by the trust verification engine by comparing the detected configuration change with the set of rules defined in the trust domain configuration file.

The result of the comparison is subsequently used to determine whether the configuration change is an authorized configuration change or an unauthorized configuration change. In response, the trust verification engine will determine that: (i) the audit event is a verified event and that the leased infrastructure is in the trusted domain if the configuration change is an authorized configuration change; and (ii) the audit event is a non-verified event and that the leased infrastructure is in the untrusted domain if the configuration change is an unauthorized configuration change.

In one or more embodiments, with respect to the asynchronous audit, any of the above methods to execute the trust audit may be implemented depending on the type of audits being executed during the asynchronous audit.

In Step 208, instructions to display a notification indicating whether a leased infrastructure is in the trusted domain or in the untrusted domain are transmitted based on the result of the determination in Step 206. These instructions may be transmitted by the notification engine (e.g., 126, FIG. 1.2) of the service and trust validation device to a computing device of a user (e.g., 105A-105N, FIG. 1.1) leasing the leased infrastructure.

In one or more embodiments, the notification may include information specifying that the leased infrastructure is in the trusted domain or in the untrusted domain. If the leased infrastructure is in the untrusted domain, the notification may also specify that the customer is in violation of the lease associated with the leased infrastructure, and that further use of the leased infrastructure while the leased infrastructure is in the untrusted domain is prohibited. In one or more embodiments, if the leased infrastructure is in the trusted domain and the audit event is a planned audit event directed to billing purposes, the notification may also specify a bill amount for costs of leasing the leased infrastructure.

To further clarify embodiments of the invention, a non-limiting example is provided in FIG. 3, and described below.

Beginning of Example

Figure 3:
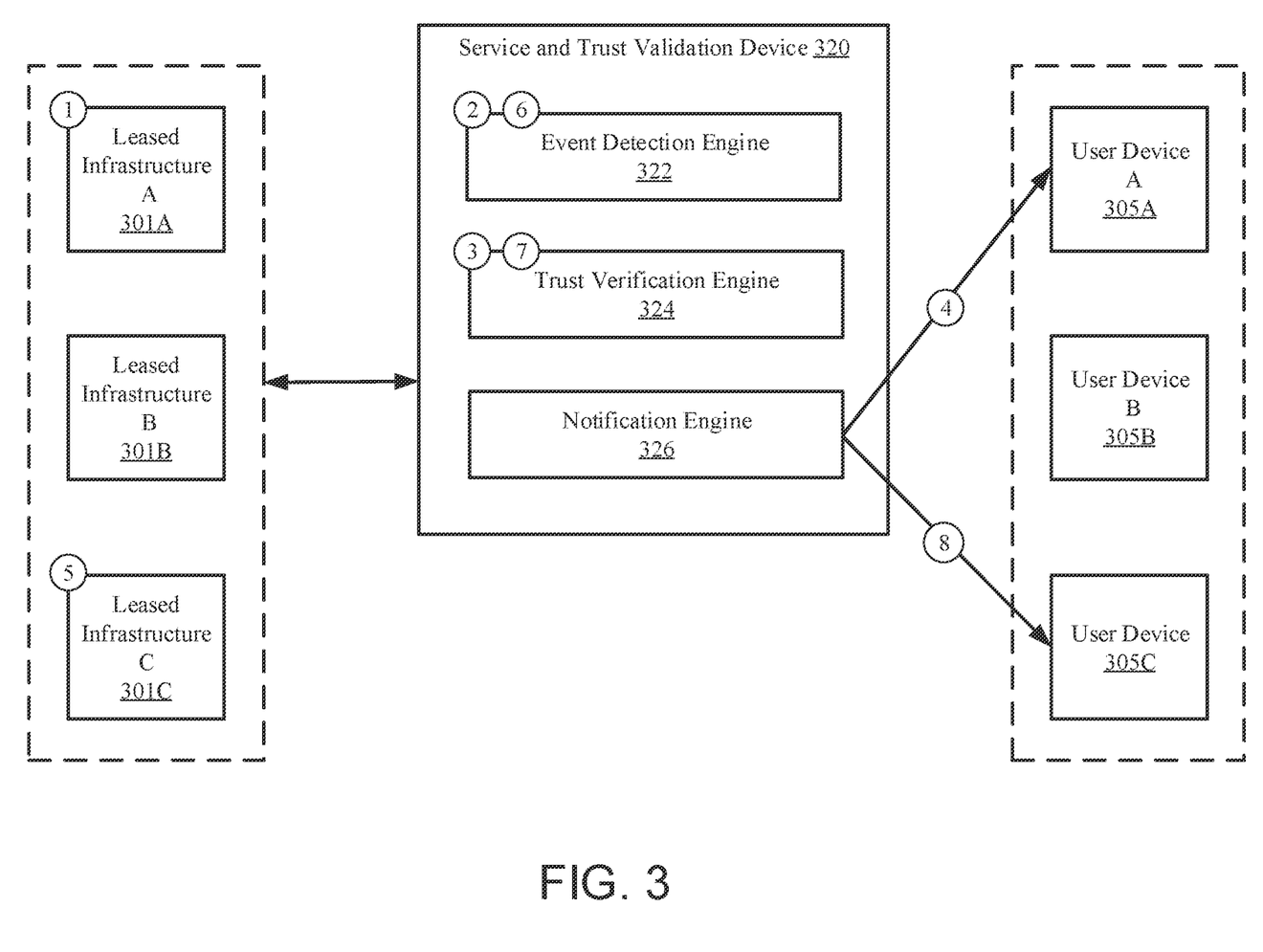
FIG. 3 shows an implementation example in accordance to one or more embodiments.

As shown in FIG. 3, a customer of leased infrastructure A (301A) makes a change (e.g., a component addition, a configuration change, etc.) to the leased infrastructure A (301A) W. This triggers an audit event at leased infrastructure A (301A), and the audit event is detected by the event detection engine (322) (e.g., 122, FIG. 1.2) of the service and trust validation device (320) (e.g., 105, FIG. 1.1; 120, FIG. 1.2) [2]. In response, the trust and verification engine (324) (e.g., 124, FIG. 1.2) determines that the change is an authorized change (i.e., that the audit event is a verified event) and leased infrastructure A (301A) remains in the trusted domain [3]. As a result, the notification engine (326) (e.g., 126, FIG. 1.2) notifies user device A (305A) associated with leased infrastructure A (301A) that leased infrastructure A (301A) remains in the trusted domain and no lease agreement violation has occurred [4].

At a same point in time as or subsequently from the above series of events, a lease of leased infrastructure C (301C) expires [5]. As part of a planned audit based on information in the lease, the event detection engine (322) detects the expiration of the lease [6]. In response, the trust and verification engine (324) determines that leased infrastructure C (301C) is now in the untrusted domain as a result of the lease expiration [7]. As a result, the notification engine (236) notifies user device C (305C) associated with leased infrastructure C (301C) that the lease has expired. leased infrastructure C (301C) is now operating in the untrusted domain, and that further use of leased infrastructure C (301C) would be in violation of the lease [8].

End of Working Example

Although the above portions of this disclosure have been described from the perspective that changes to the leased infrastructure are made by one or more customers leasing a leased infrastructure, one or more embodiments of this disclosure is not limited to changes made by customers. In particular, changes to the leased infrastructure may be made by anyone (e.g., the provider, a third-party user, etc.). For example, a third-party user such as a hacker may cause one or more configuration changes triggering one or more configuration audits. As another example, a provider of the leased infrastructure may periodically update the leased infrastructure by adding and/or removing resources from the leased infrastructure.

Figure 4:
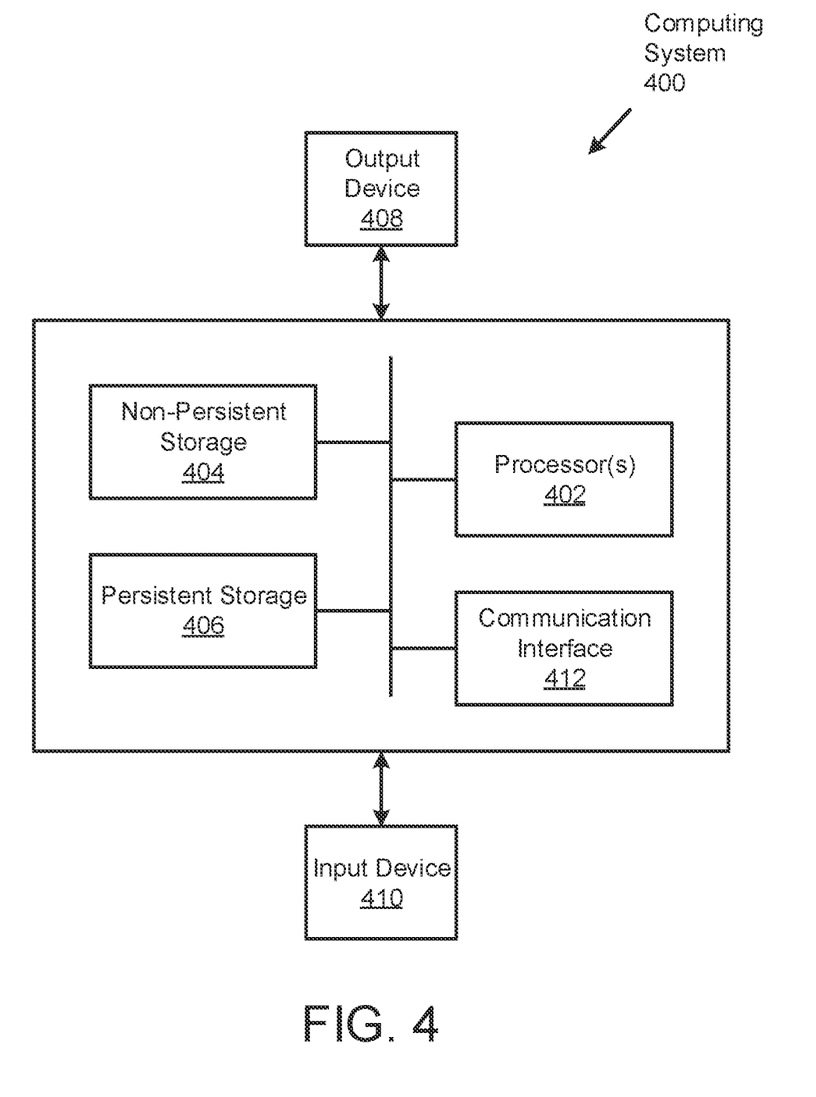
FIG. 4 shows a computer system in accordance to one or more embodiments.

FIG. 4 shows a computer system in accordance to one or more embodiments.

Embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

Embodiments disclosed herein may provide the ability to ensure accurate billing and lease violation validations associated with one or more leased infrastructures provided by a provider. In particular, customers only wish to pay for products and/or services that they know are verified (i.e., trusted). Furthermore, providers also wish to know whether customers leasing their leased infrastructures are in violation of one or more leases associated with the leased infrastructures. Consequently, embodiments disclosed herein that are able to accurately determine whether leased infrastructures fall within a trusted domain defined by a provider advantageously provide both the customers and providers of leased infrastructures with a peace of mind with respect to the use of the leased infrastructure.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for processing trust and security for leased infrastructure, the method comprising:
   initiating, before a start of a lease of the leased infrastructure, execution of:
      tamper verification and proofing of the leased infrastructure;
      data sanitation of data stored in the leased infrastructure; and
      integrity verification of a basic input/output system (BIOS) and firmware configuration of the leased infrastructure, to determine that all components of the leased infrastructure fall within a trusted domain;
   detecting, after the start of the lease of the leased infrastructure and by an event detection engine of a first computing device, a first audit event directed to the leased infrastructure, wherein:
      event detection engine is continuously monitoring activities recorded in one or more event logs of a second computing device to determine if the leased infrastructure has been changed in anyway, or the event detection engine is continuously monitoring one or more configurations of a plurality of systems of the leased infrastructure for a change in the one or more configurations;
   in response to detecting the first audit event: executing, by a trust verification engine of the first computing device, an execution of a first trust audit to generate a first audit result;
   making a first determination, based on the first audit result and by the first computing device, that the first audit event is a verified event;

transmitting, by a notification engine of the first computing device, in response to the first determination, and to a third computing device of a user leasing the leased infrastructure, first instructions for the third computing device to display a first output notifying the user that the leased infrastructure is in the trusted domain, wherein the third computing device executes the first instructions and displays the first output to the user and wherein the third computing device is operatively connected to the first computing device;

detecting, by the event detection engine of the first computing device, a second audit event directed to the leased infrastructure, wherein the event detection engine is further continuously monitoring activities recorded in the one or more event logs of the second computing device to determine if the leased infrastructure has been changed in any way;

in response to detecting the second audit event: executing, by the trust verification engine of the first computing device, an execution of a second trust audit to generate a second audit result;

making a second determination, by the first computing device and based on the second audit result, that the second audit event is a non-verified event;

transmitting, by the notification engine of the first computing device, in response to the second determination, and to the third computing device of the user leasing the leased infrastructure, second instructions for the third computing device to display a second output notifying the user that the leased infrastructure is in an untrusted domain, wherein the third computing device executes the second instructions and displays the second output to the user; and making a third determination directed to a billing and lease validation of the leased infrastructure based on whether the leased infrastructure is in the trusted domain or the untrusted domain.

2. The method of claim 1, wherein
the second audit event is the change in the one or more configurations of the leased infrastructure, wherein the change in the one or more configurations is executed in a firmware, a basic input/output system (BIOS), or an operating system (OS) of the leased infrastructure; and
in response to the second audit event being the change in the one or more configurations, execution of the second trust audit comprises verifying the change in the one or more configurations by:
   initiating execution of a verification of the change in the one or more configurations; and
   determining, in response to the verification, whether the change in the one or more configurations is an authorized configuration change, wherein
   the second audit event is the verified event if the change in the one or more configurations is the authorized configuration change and the second audit event is the non-verified event if the change in the one or more configurations is not the authorized configuration change.

3. The method of claim 1, wherein
the first audit event is a change in the leased infrastructure by an addition of a component to the leased infrastructure; and
in response to the first audit event being the addition of the component, execution of the first trust audit comprises verifying the addition of the component by:
   initiating execution of a measurement of the component;
   comparing a result of the measurement to a predetermined trusted measurement value; and
   determining, based on the comparing, whether the result of the measurement matches the predetermined trusted measurement value, wherein
   the first audit event is the verified event if the result of the measurement matches the predetermined trusted measurement value and the first audit event is the non-verified event if the result of the measurement does not match the predetermined trusted measurement value.

4. The method of claim 1, wherein
the first audit event is a change in the leased infrastructure by an addition of a service to the leased infrastructure; and
in response to the first audit event being the addition of the service, execution of the first trust audit comprises verifying the addition of the service by:
   initiating execution of a verification of the service; and
   determining, in response to the verification, whether the service matches an authorized service among a list of authorized services, wherein
   the first audit event is the verified event if the service matches the authorized service and the first audit event is the non-verified event if the service does not match any service among the list of authorized services.

5. The method of claim 1, wherein
the first audit event is a change in the leased infrastructure by an addition of a resource to the leased infrastructure, wherein the resource comprises a component and a service; and
in response to the first audit event being the addition of the resource, execution of the first trust audit comprises verifying the addition of the resource by:
   initiating execution of a verification of the resource; and
   determining, in response to the verification, whether the component or the service is an unauthorized component or service, wherein
   the first audit event is the verified event if both of the component and the service are not the unauthorized component or service and the first audit event is the non-verified event if either of the component or the service is the unauthorized component or service.

6. A non-transitory computer readable medium (CRM) storing instructions that when executed by a computer causes the computer to execute a method for processing trust and security for leased infrastructure, the method comprising:
   initiating, before a start of a lease of the leased infrastructure, execution of:
      tamper verification and proofing of the leased infrastructure;
      data sanitation of data stored in the leased infrastructure; and
      integrity verification of a basic input/output system (BIOS) and firmware configuration of the leased infrastructure, to determine that all components of the leased infrastructure fall within a trusted domain;
   detecting, after the start of the lease of the leased infrastructure and by an event detection engine of a first computing device, a first audit event directed to the leased infrastructure, wherein:
      the first computer device is a service and trust validation device and is operatively connected to a second computing device of the leased infrastructure;

the event detection engine is continuously monitoring activities recorded in one or more event logs of the second computing device to determine if the leased infrastructure has been changed in any way, or the event detection engine is continuously monitoring one or more configurations of a plurality of systems of the leased infrastructure for a change in the one or more configurations;

in response to detecting the first audit event: executing, by a trust verification engine of the first computing device, an execution of a first trust audit to generate a first audit result;

making a first determination, based on the first audit result and by the first computing device, that the first audit event is a verified event;

transmitting, by a notification engine of the first computing device, in response to the first determination, and to a third computing device of a user leasing the leased infrastructure, first instructions for the third computing device to display a first output notifying the user that the leased infrastructure is in the trusted domain, wherein the third computing device executes the first instructions and displays the first output to the user and wherein the third computing device is operatively connected to the first computing device;

detecting, by the event detection engine of the first computing device, a second audit event directed to the leased infrastructure, wherein the event detection engine is further continuously monitoring activities recorded in the one or more event logs of the second computing device to determine if the leased infrastructure has been changed in any way;

in response to detecting the second audit event: executing, by the trust verification engine of the first computing device, an execution of a second trust audit to generate a second audit result;

making a second determination, by the first computing device and based on the second audit result, that the second audit event is a non-verified event;

transmitting, by the notification engine of the first computing device, in response to the second determination, and to the third computing device of the user leasing the leased infrastructure, second instructions for the third computing device to display a second output notifying the user that the leased infrastructure is in an untrusted domain, wherein the third computing device executes the second instructions and displays the second output to the user; and making a third determination directed to a billing and lease validation of the leased infrastructure based on whether the leased infrastructure is in the trusted domain or the untrusted domain.

7. A system comprising:
a storage; and
a processor coupled to the storage, wherein a first computing devices comprises the processor and is configured to:
  initiating, before a start of a lease of a leased infrastructure, execution of:
    tamper verification and proofing of the leased infrastructure;
    data sanitation of data stored in the leased infrastructure; and
    integrity verification of a basic input/output system (BIOS) and firmware configuration of the leased infrastructure, to determine that all components of the leased infrastructure fall within a trusted domain;
  detect, after the start of the lease of the leased infrastructure and by an event detection engine of the first computing device, a first audit event directed to a leased infrastructure, wherein:
    the first computer device is a service and trust validation device and is operatively connected to a second computing device of the leased infrastructure;
    the event detection engine is continuously monitoring activities recorded in one or more event logs of the second computing device to determine if the leased infrastructure has been changed in any way, or the event detection engine is continuously monitoring one or more configurations of a plurality of systems of the leased infrastructure for a change in the one or more configurations;
  in response to detecting the first audit event: execute, by a trust verification engine of the first computing device, a first trust audit to generate a first audit result;
  make a first determination, based on the first audit result and by the first computing device, that the first audit event is a verified event;
  transmit, by a notification engine of the first computing device, in response to the first determination and to a third computing device of a user leasing the leased infrastructure, first instructions for the third computing device to display a first output notifying the user that the leased infrastructure is in the trusted domain, wherein the third computing device executes the first instructions and displays the first output to the user and wherein the third computing device is operatively connected to the first computing device;
  detect, by the event detection engine of the first computing device, a second audit event directed to the leased infrastructure, wherein the event detection engine is further continuously monitoring activities recorded in the one or more event logs of the second computing device to determine if the leased infrastructure has been changed in any way;
  in response to detecting the second audit event: execute, by the trust verification engine of the first computing device, a second trust audit to generate a second audit result;
  make a second determination, based on the second audit result, that the second audit event is a non-verified event;
  transmit, by the notification engine of the first computing device, in response to the second determination and to the third computing device of the user leasing the leased infrastructure, second instructions for the third computing device to display a second output notifying the user that the leased infrastructure is in an untrusted domain, wherein the third computing device executes the second instructions and displays the second output to the user; and
  make a third determination directed to a billing and lease validation of the leased infrastructure based on whether the leased infrastructure is in the trusted domain or the untrusted domain.

* * * * *